(12) United States Patent
Mielniczek

(10) Patent No.: US 9,364,766 B2
(45) Date of Patent: Jun. 14, 2016

(54) PROPULSION SYSTEM FOR A VEHICLE OR A TOY VEHICLE

(71) Applicant: Witold Mielniczek, London (GB)

(72) Inventor: Witold Mielniczek, London (GB)

(*) Notice: Subject to any disclaimer, the term of this patent is extended or adjusted under 35 U.S.C. 154(b) by 0 days.

(21) Appl. No.: 14/405,372

(22) PCT Filed: Jun. 7, 2013

(86) PCT No.: PCT/EP2013/061864
§ 371 (c)(1),
(2) Date: Dec. 3, 2014

(87) PCT Pub. No.: WO2013/182708
PCT Pub. Date: Dec. 12, 2013

(65) Prior Publication Data
US 2015/0093956 A1    Apr. 2, 2015

(30) Foreign Application Priority Data

Jun. 7, 2012  (GB) .................................. 1210010.3

(51) Int. Cl.
| | |
|---|---|
| A63H 27/127 | (2006.01) |
| A63H 17/26 | (2006.01) |
| A63H 27/00 | (2006.01) |
| A63H 33/00 | (2006.01) |
| B60F 5/02 | (2006.01) |

(52) U.S. Cl.
CPC .............. *A63H 17/26* (2013.01); *A63H 17/262* (2013.01); *A63H 27/12* (2013.01); *A63H 33/003* (2013.01); *B60F 5/02* (2013.01)

(58) Field of Classification Search
USPC ......... 446/36, 37, 57, 58, 431, 434, 457, 465; 244/2, 13, 17.11, 17.17, 17.19, 17.23, 244/50
See application file for complete search history.

(56) References Cited

U.S. PATENT DOCUMENTS

| | | | |
|---|---|---|---|
| 4,043,421 A | 8/1977 | Smith | |
| 4,505,346 A * | 3/1985 | Mueller | 180/7.4 |
| 5,746,390 A * | 5/1998 | Chiappetta | 244/12.3 |
| 6,402,088 B1 | 6/2002 | Syrovy | |
| 7,959,104 B2 * | 6/2011 | Kuntz | 244/2 |
| 8,147,289 B1 * | 4/2012 | Lee | 446/36 |
| 8,528,854 B2 * | 9/2013 | Yan et al. | 244/17.23 |
| 8,794,564 B2 * | 8/2014 | Hutson | 244/17.17 |
| 8,794,566 B2 * | 8/2014 | Hutson | 244/17.23 |
| 8,827,200 B2 * | 9/2014 | Radu | 244/2 |
| 8,991,740 B2 * | 3/2015 | Olm et al. | 244/2 |
| 9,061,558 B2 * | 6/2015 | Kalantari et al. | |

(Continued)

FOREIGN PATENT DOCUMENTS

| | | |
|---|---|---|
| EP | 1810735 | 8/2007 |
| WO | WO2007130653 | 11/2007 |

*Primary Examiner* — Kurt Fernstrom
(74) *Attorney, Agent, or Firm* — Cherskov Flaynik & Gurda, LLC

(57) ABSTRACT

A propulsion system for a vehicle or toy vehicle is disclosed. The system comprises rotary drive means for driving the vehicle along ground, the rotary drive means operating in a plane and having a peripheral ground-engagement part. The system further comprises a rotor comprising one or more rotor blades rotatable about a rotor axis for producing thrust, wherein the rotary drive means and the rotor are positioned relative to each other so that during rotation of the rotor, the rotor blades pass through the plane of the rotary drive means, inside the peripheral ground-engagement part. In this way, the rotor blades are protected by the peripheral ground-engagement part.

13 Claims, 9 Drawing Sheets

(56) References Cited

U.S. PATENT DOCUMENTS

2005/0230524 A1 10/2005 Ishiba
2006/0016930 A1 1/2006 Pak
2008/0048065 A1 2/2008 Kuntz
2011/0042507 A1* 2/2011 Seiford, Sr. ...................... 244/2
2014/0319266 A1* 10/2014 Moschetta et al. .............. 244/13

* cited by examiner

PROPULSION SYSTEM FOR A VEHICLE OR A TOY VEHICLE

CROSS-REFERENCE TO RELATED APPLICATIONS

This application claims the benefit of priority as the nationalization of international application PCT/EP2013/061864, filed Jun. 7, 2013 which in turn claimed priority to British Application Number GB1210010.3, currently abandoned, filed on Jun. 7, 2012.

The present invention relates to propulsion systems for vehicles or toy vehicles, which have the capability of travelling on the ground or in the air.

It is known to provide a vehicle or aircraft that can travel on land as well as in the air. For example, vertical take-off and landing vehicles or craft such as the Harrier Jump Jet have good capabilities in the air, but are not suited to movement on rough terrain.

It is thus desirable to provide a vehicle having all-terrain capability on the ground as well as vertical take-off and landing and moving take-off and landing air capabilities.

The present invention provides a propulsion system for a vehicle or toy vehicle comprising rotary drive means for driving the vehicle along the ground, the rotary drive means operating in a plane and having a peripheral ground-engagement part, the system further comprising a rotor comprising one or more rotor blades rotatable about a rotor axis for producing thrust, wherein the rotary drive means and the rotor are positioned relative to each other so that during rotation of the rotor, the rotor blades pass through the plane of the rotary drive means, inside the peripheral ground-engagement part.

Advantageously, the propulsion system according to the invention allows travel on the ground by virtue of the rotary drive means and travel in the air by virtue of the rotor.

The invention advantageously provides a compact arrangement by virtue of the rotor blades passing through the plane of the rotary drive means. Further, because the peripheral ground-engagement part extends around the rotor blades to some extent, it protects the blades from contacting external objects. In this regard, it is particularly advantageous if the rotor axis lies in the plane of the rotary drive means, because then the coverage of the blades by the peripheral ground-engagement part is maximised.

The present invention also provides a vehicle or a toy vehicle comprising a chassis and one or more propulsion systems as defined above connected to the chassis.

The invention finds use in many different areas. For example the invention can be used in the following industries:
  Toy industry—Radio Control model
  Defence industry—use as a spy drone in harsh environments (on land or in air)
  Search and Rescue—as a first response vehicle for dangerous environments or natural disasters where many obstacles are present between casualties and rescue team
  Film industry—interesting and unique camera perspectives can be achieved with a combination of driving, flying and climbing
  Exploration—can get to hard to reach places on Earth or other planets where it may not have been possible to reach before.

In one embodiment the invention is implemented as a four-wheeled vehicle, ie having four propulsion systems, which can drive as well as fly, is capable of vertical take off and landing, climbing 90° surfaces and driving up side down.

In one embodiment, ground driving can be achieved by a rear wheel drive system, while the front wheels may have only their rotor driven.

The present invention can be put into practice in various ways, but embodiments will now be described by way of example only with reference to the accompanying drawings in which.

Figure 1:
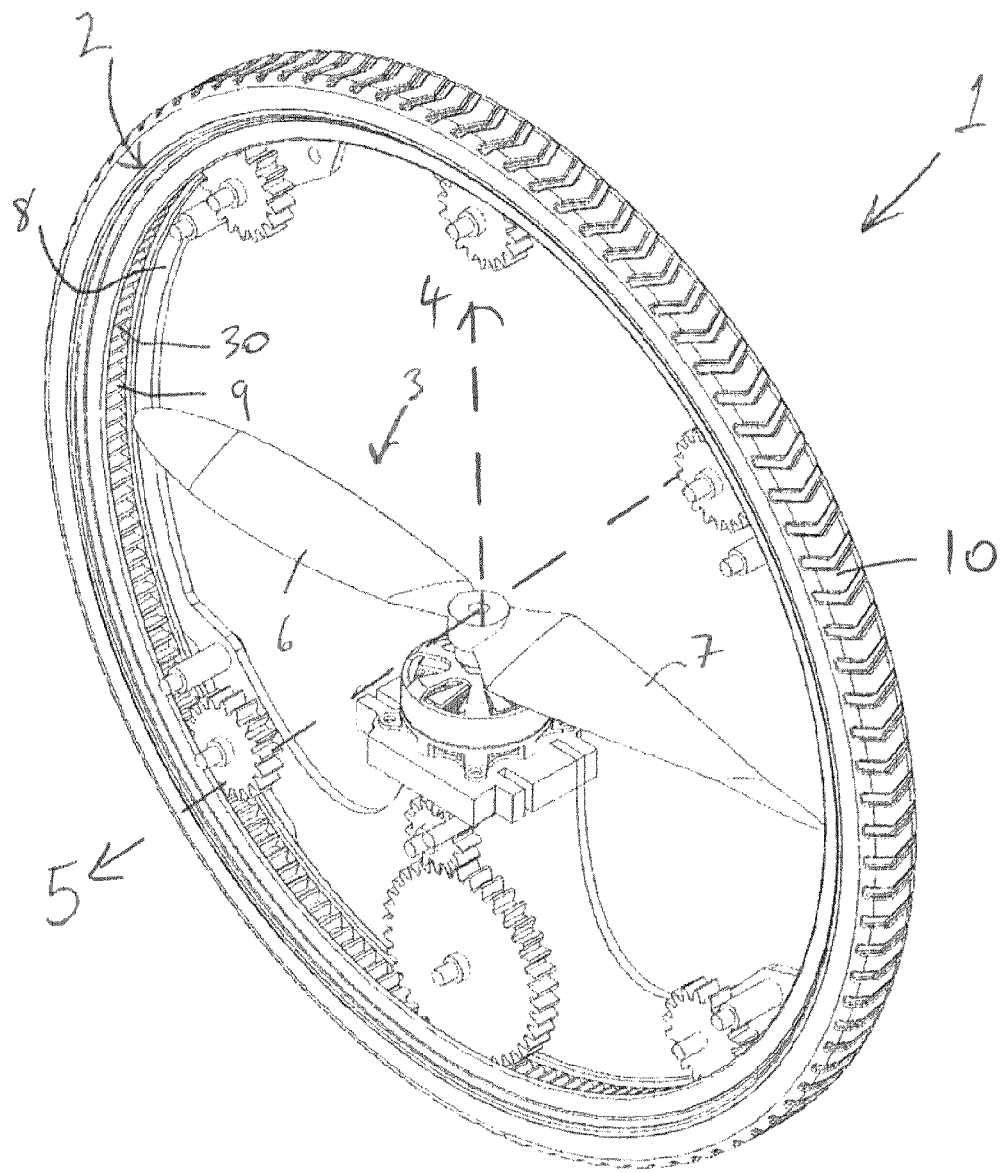
FIG. 1 is a perspective cutaway view of a propulsion system embodying the present invention.

The propulsion system 1 shown in FIG. 1 comprises a hubless wheel 2 rotatable about a wheel axis 5. The propulsion system 1 also has a rotor 3 rotatable about a rotor axis 4. The rotor 3 comprises first 6 and second 7 blades disposed on either side of the rotor axis 4. The rotor axis 4 lies in the plane defined within the rim 8 of the wheel and is perpendicular to the wheel axis 5. The wheel axis 5 and the rotor axis 4 intersect each other at the centre point of the wheel. The wheel has a rubber tyre 10 provided at its periphery.

Figure 2:
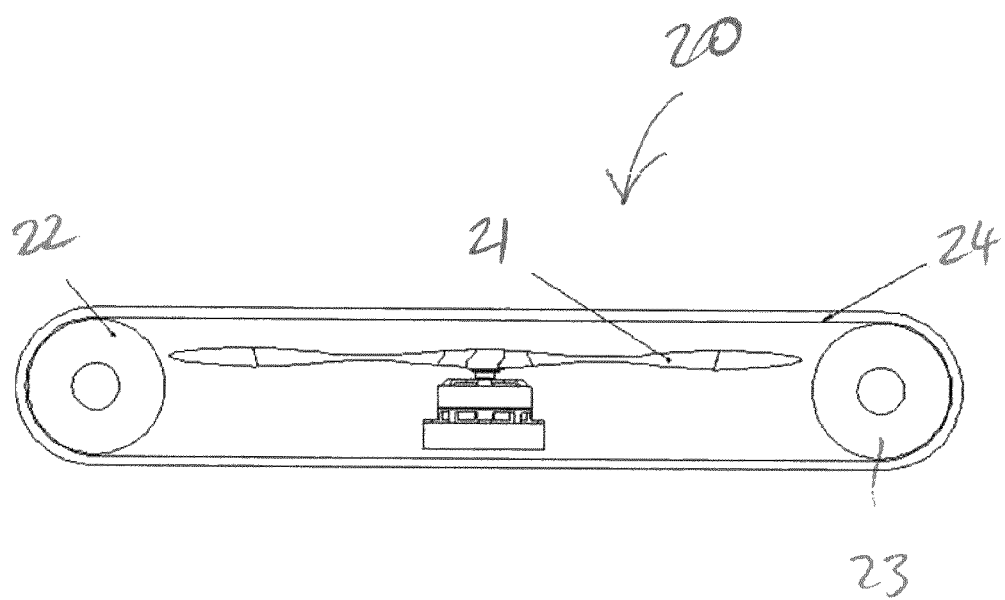
FIG. 2 is a side view of a second embodiment of the invention.

FIG. 2 shows a second embodiment of a propulsion system 20 comprising first and second wheels 22, 23 which drive a belt or track 24. In the space defined between the track 24 and the wheels a rotor 21 is disposed. The rotor rotates about an axis that is perpendicular to the axis of rotation of the wheels.

It is also possible to combine the embodiments of FIG. 1 and FIG. 2 by providing a belt 24 around hubless wheels 2 which contain a rotor, and optionally providing a rotor in the space between the belt and the hubless wheels.

Figure 3:
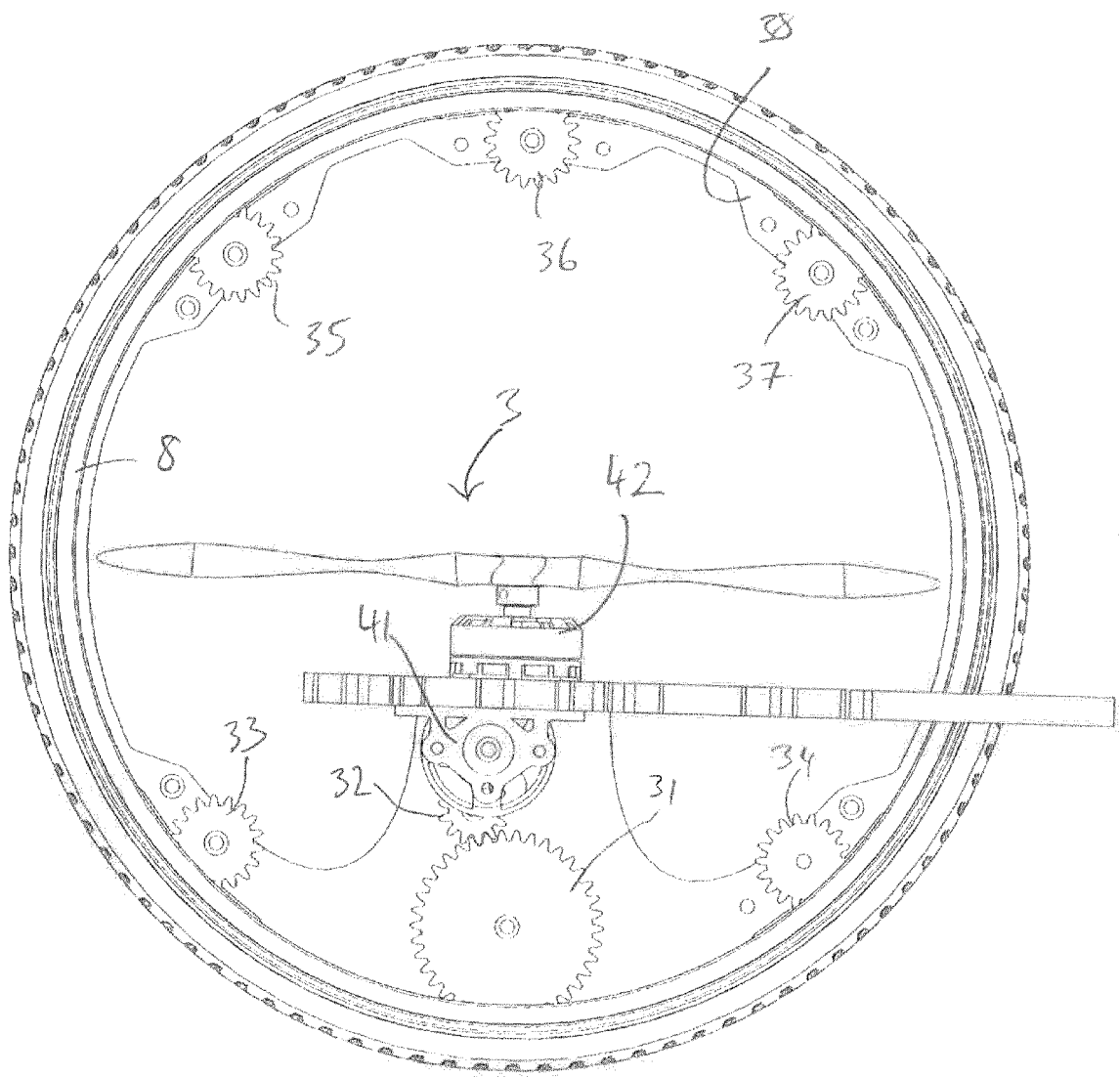
FIG. 3 is a side cutaway view of the propulsion system shown in FIG. 1.

FIG. 3 illustrates some details of the driving mechanism used to operate the propulsion system. The hubless wheel 2 is mounted on the rim 8 and comprises an internal toothed gear 9, which is driven by a drive gear 31. A motor 41 drives the drive gear 31 through a small connecting gear 32. A plurality of guide gears 33, 34, 35, 36, 37 are mounted on the rim 8 as well and ensure that the internal toothed gear 9 of the hubless wheel 2 is held in position, whilst allowing it to rotate. The motor 41 can be any appropriate type of motor, and in the preferred embodiment, an electric motor is used. As an alternative to the internal toothed gear 9, the wheel may use a friction mounting and drive system.

Figure 4:
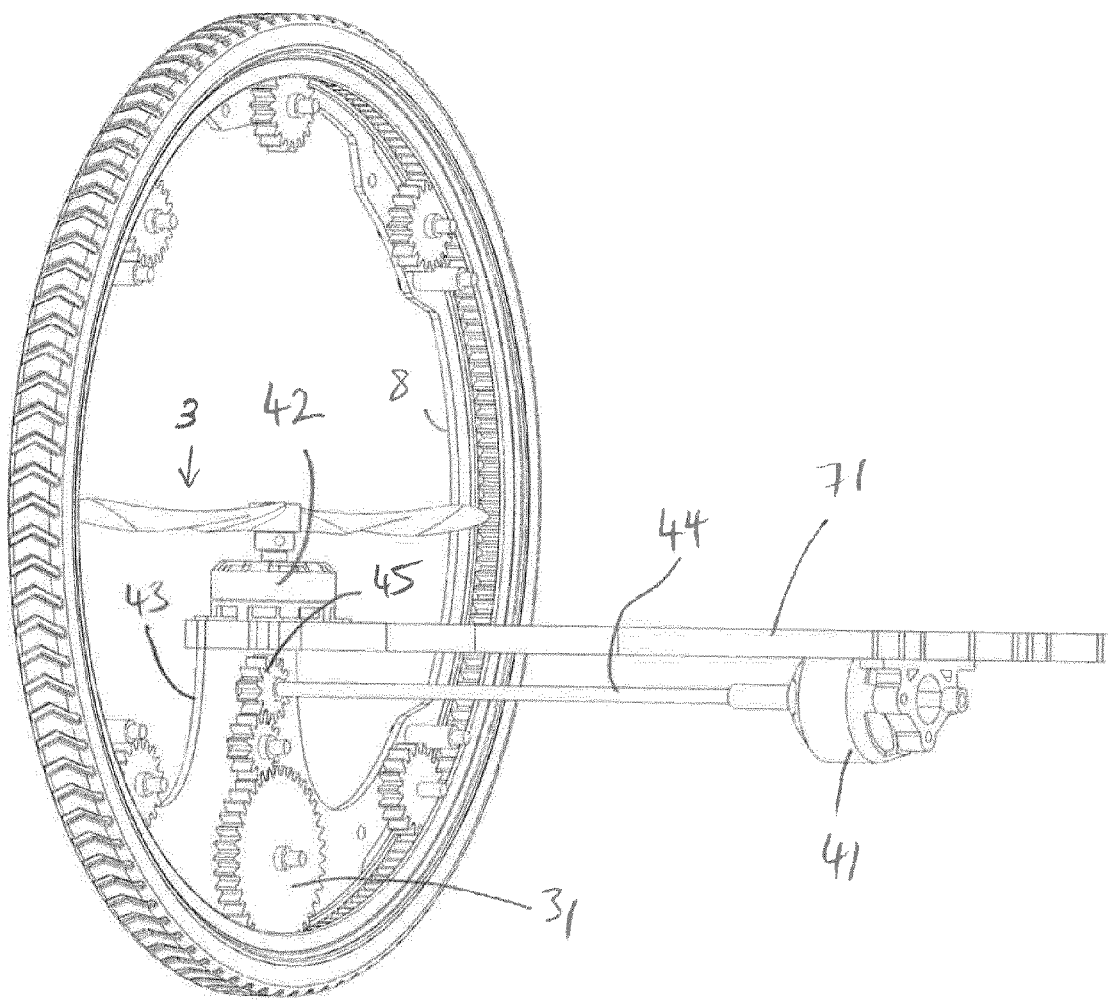
FIG. 4 is a perspective view of the propulsion system of FIG. 1 from the rear.
Figure 7:
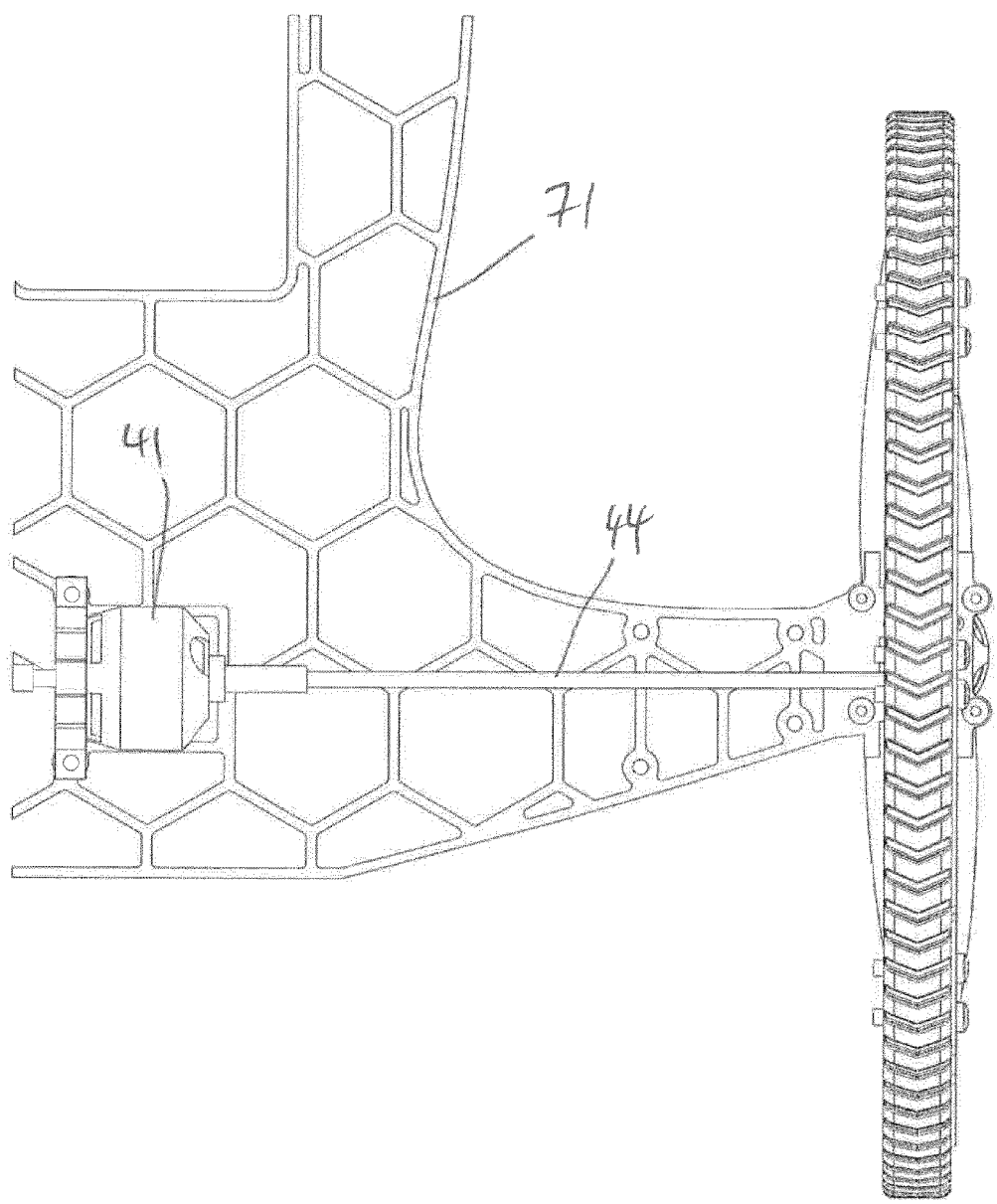
FIG. 7 is a partial view of a vehicle including a chassis and a propulsion system embodying the invention.

The rotor 3 is driven by a separate motor 42 in this embodiment. This advantageously allows independent control of the driving and flying modes of operation. However, the propulsion system may also be driven by a single motor including appropriate gearing for simultaneously driving the wheel and the rotor. FIGS. 4 and 7 show an axle 44 that connects the wheel-driving motor 41 to a spur gear 45 that drives the connecting gear 32 and thus drives the drive gear 31. The rim 8 includes a support means 43 comprising a radially inward extension which connects to the chassis 71 of a vehicle and on which the rotor 3 and the drive gear 31 are supported. The rim 8 is made from a flexible plastics material such as polycarbonate and/or nylon 66, which thus advantageously acts as a shock absorber, absorbing impacts to the wheel and protecting the rotor. The vehicle, in toy form, is particularly adept at surviving crash landings at high speeds.

Figure 5:
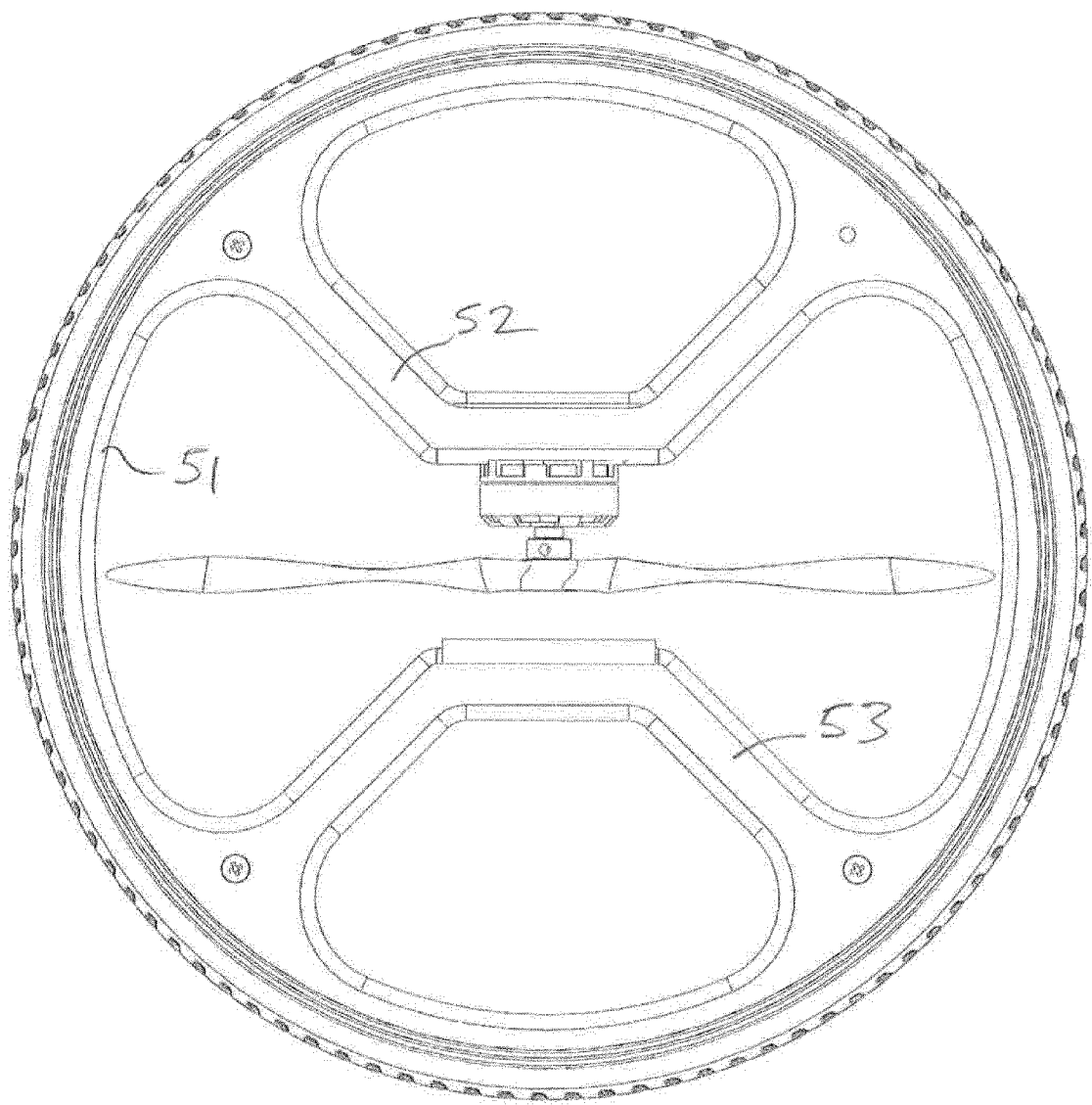
FIG. 5 is a side view of a third embodiment of the propulsion system.
Figure 6:
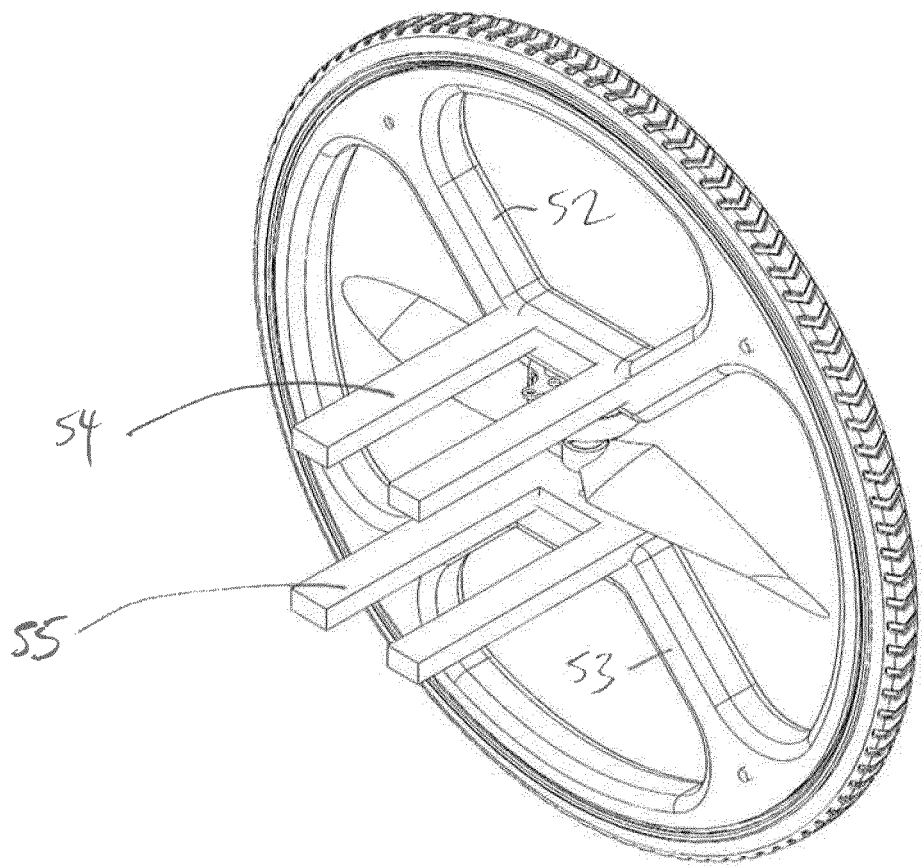
FIG. 6 is a perspective view of the propulsion system shown in FIG. 5.

FIG. 5 shows an embodiment of the propulsion system having a rim 51 which includes two support brackets 52 and 53. Each support bracket is connected to a pair of struts 54, 55 that connect the propulsion system to a suspension system. Thus instead of using the support means 43 to provide shock absorption, the system has an independent means of absorbing shocks. This embodiment allows more effective suspension for embodiments of the invention that have a larger mass. The rim is sealed in this embodiment, ensuring that dirt does not get into the internal tooth gear of the wheel.

Figure 8:
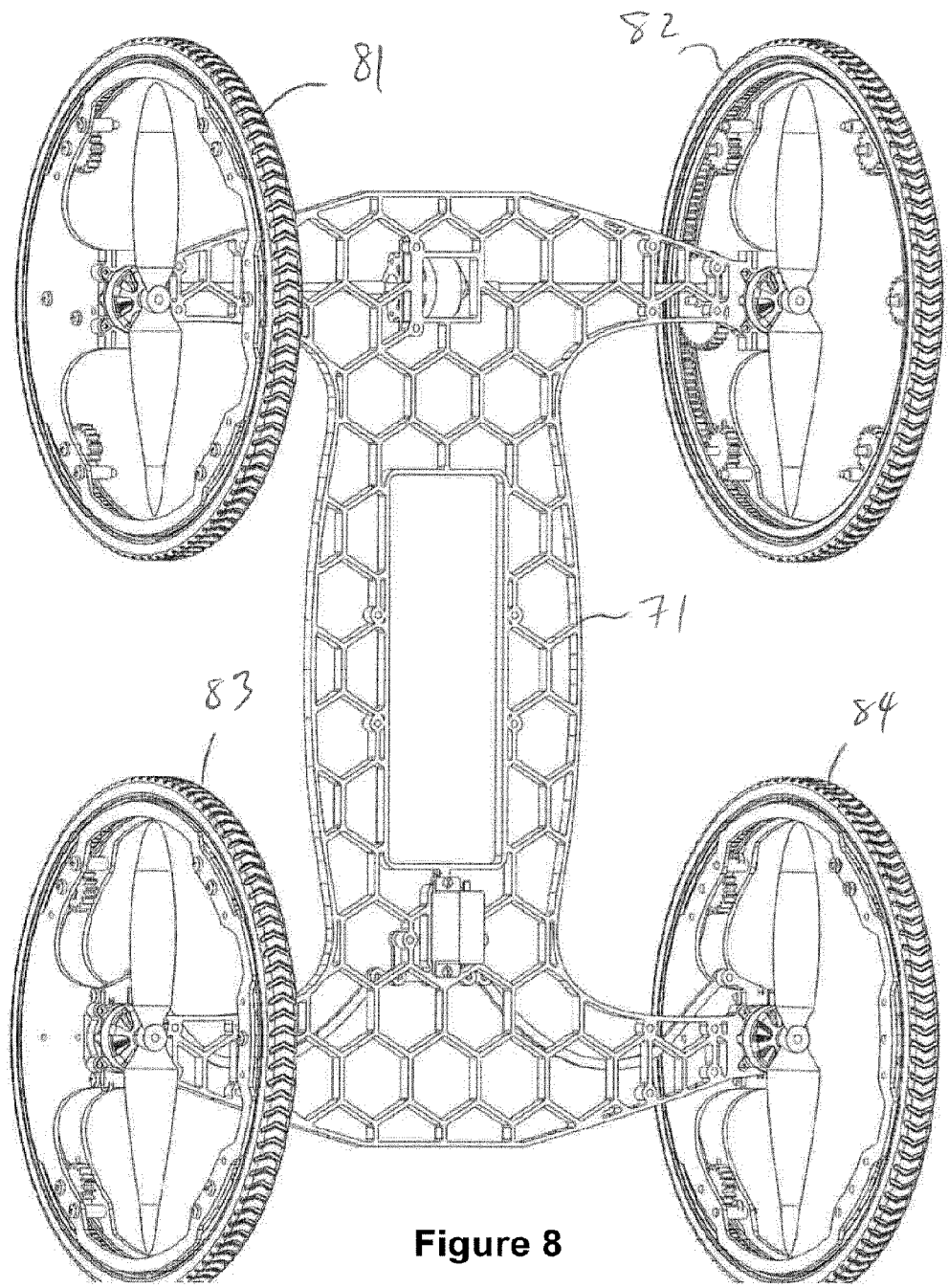
FIG. 8 is a perspective top view of a vehicle embodying the invention.
Figure 9:
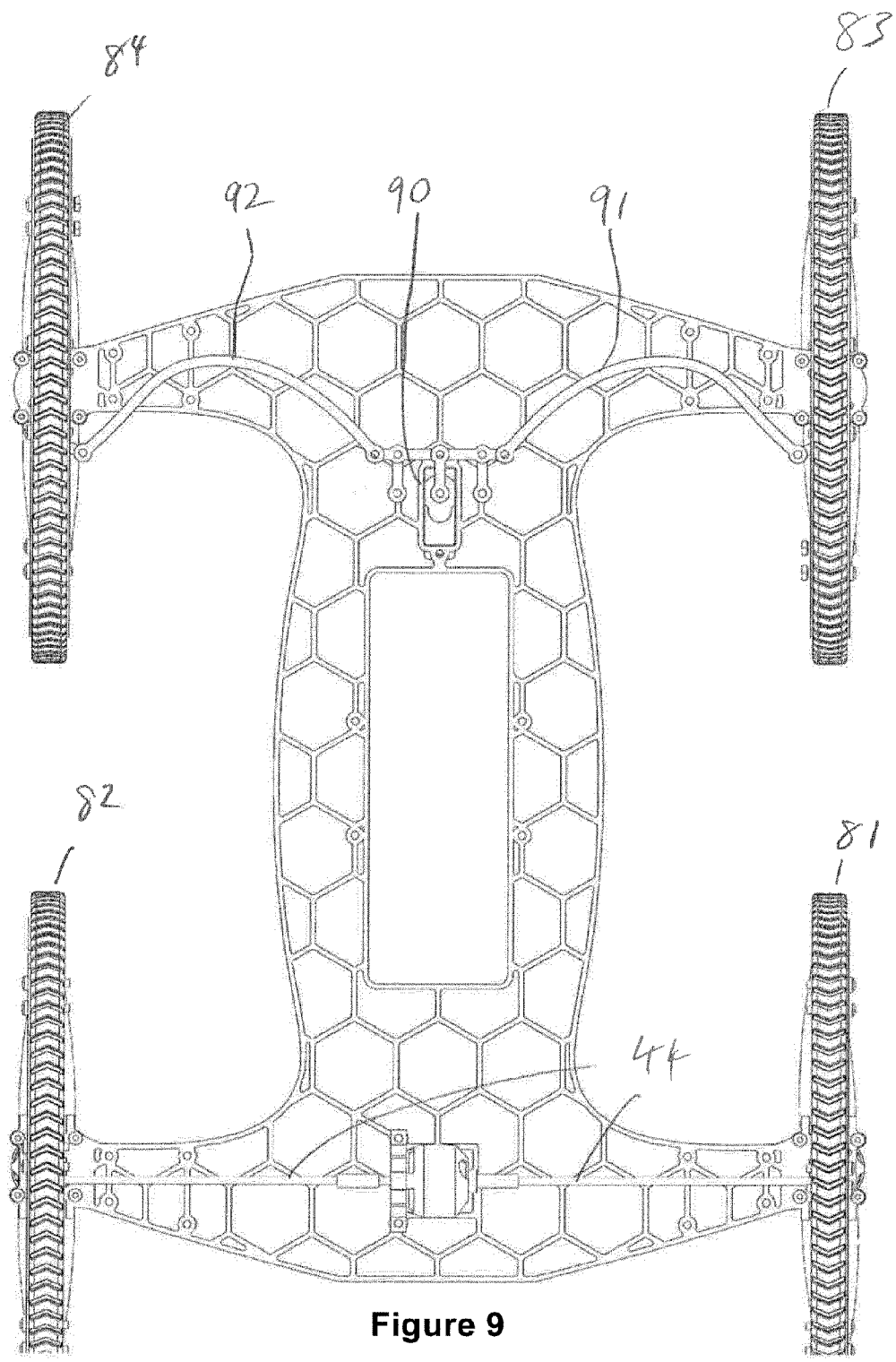
FIG. 9 is an underside view of the vehicle shown in FIG. 8.

FIG. 8 shows a vehicle embodying the invention including a chassis 71 and as shown from the underside in FIG. 9, the vehicle has a steering mechanism including a servo 90 which actuates first and second linkage arms 91, 92 to steer the front propulsion units 83 and 84 respectively. The linkage arms are made from resilient material and are curved to allow flexing, thus avoiding the need for a servo saver spring. In this embodiment of the vehicle, the rear wheels 81, 82 are driven via the axle 44 and provide thrust via their rotors. The front propulsion systems 83, 84 on the other hand simply provide steering and thrust when needed and do not provide any driving force along the ground.

The vehicle has several different modes of operation. Firstly, it can be simply driven along the ground. In this mode, the rear wheels 81, 82 are driven by the axle 44 and the motors that power the rotors remain inactive. In a second mode, the vehicle can be driven along the ground and the rotors operated simultaneously allowing moving take-off and landing manoeuvres to be executed. By selecting the direction of rotation of the rotors, the thrust may be in an upward or downward direction relative to the vehicle. When the thrust acts to urge the vehicle in a downward direction, the rotor thrust can be used in combination with driving of the wheels to allow the vehicle to drive up very steep, even vertical surfaces, or even to drive upside down along a surface.

The invention claimed is:

1. A propulsion system for a vehicle or toy vehicle comprising:
a rotary drive means for driving the vehicle along ground, the rotary drive means operating in a plane and having a peripheral ground-engagement part, further comprising a rotor comprising one or more rotor blades rotatable about a rotor axis for producing thrust,
wherein the rotary drive means and the rotor are positioned relative to each other so that during rotation of the rotor, the rotor blades pass through the plane of the rotary drive means, enclosed inside the peripheral ground-engagement part;
wherein the rotary drive means comprises a caterpillar-type drive and the peripheral ground-engagement part comprises an endless belt mounted on at least two wheels.

2. A propulsion system for a vehicle or toy vehicle comprising:
a rotary drive means for driving the vehicle along ground, the rotary drive means operating in a plane and having a peripheral ground-engagement part, further comprising a rotor comprising one or more rotor blades rotatable about a rotor axis for producing thrust,
wherein the rotary drive means and the rotor are positioned relative to each other so that during rotation of the rotor, the rotor blades pass through the plane of the rotary drive means, enclosed inside the peripheral ground-engagement part;
wherein the rotor axis lies in the plane of the rotary drive means.

3. The propulsion system according to claim 2, wherein the rotor axis and the wheel's axis are perpendicular to each other.

4. The Propulsion system according to claim 3, wherein the rotor axis and the wheel axis intersect each other.

5. The Propulsion system according to claim 3, wherein a center point of the rotor and a center point of the wheel coincide with each other.

6. A propulsion system for a vehicle or toy vehicle comprising:
a rotary drive means for driving the vehicle along ground, the rotary drive means operating in a plane and having a peripheral ground-engagement part, further comprising a rotor comprising one or more rotor blades rotatable about a rotor axis for producing thrust;
wherein the rotary drive means and the rotor are positioned relative to each other so that during rotation of the rotor, the rotor blades pass through the plane of the rotary drive means, inside the peripheral ground-engagement part; and
wherein the rotary drive means comprises a caterpillar-type drive and the peripheral ground-engagement part comprises an endless belt mounted on at least two wheels.

7. The propulsion system according to claim 6, wherein the rotary drive means comprises a hubless wheel mounted on a rim for rotation about a wheel axis.

8. The propulsion system according to claim 7, wherein a center point of the rotor and a center point of the wheel coincide with each other.

9. The propulsion system according to claim 7, wherein the rim includes support means for attaching the wheel to a vehicle chassis.

10. The propulsion system according to claim 9, wherein the rotor is mounted on the support means.

11. The propulsion system according to claim 9, wherein the support means comprises first and second brackets connected to suspension struts.

12. The propulsion system according to claim 6, further comprising one or more motors for driving the rotor and the rotary drive means.

13. The propulsion system according to claim 6, further comprising four propulsion systems connected to the vehicle chassis.

* * * * *